(No Model.) 2 Sheets—Sheet 2.
S. B. & S. WELCH.
HAY FORK.
No. 502,155. Patented July 25, 1893.
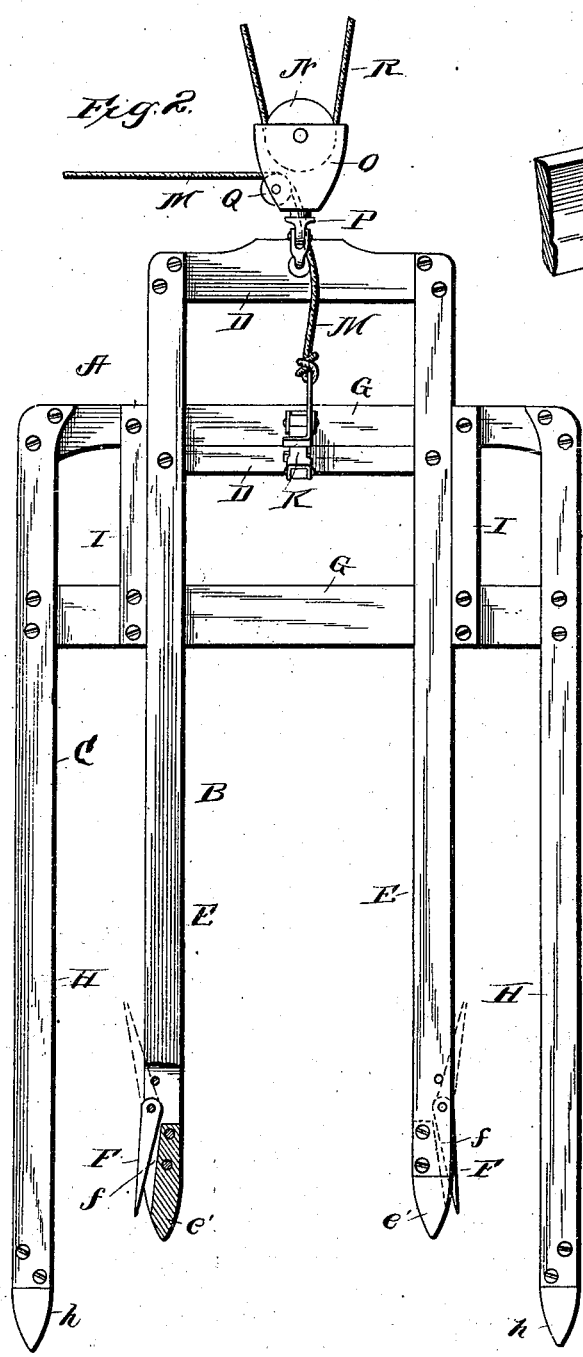
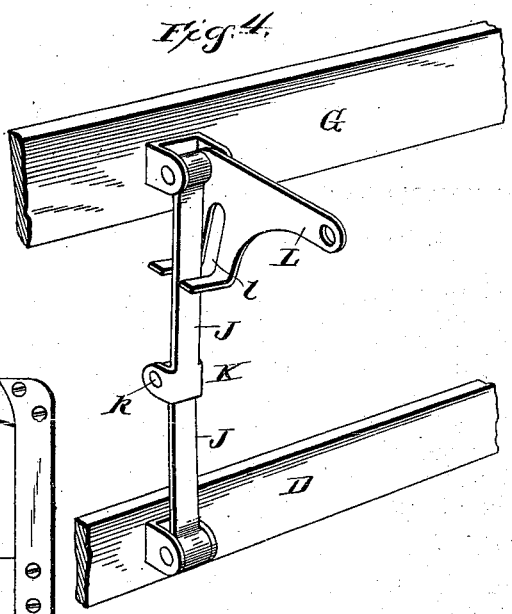
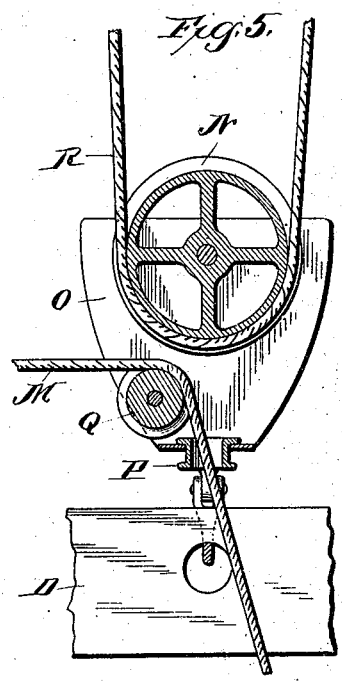
Witnesses
Inventors
S. B. Welch and
S. Welch
By their Attorneys,

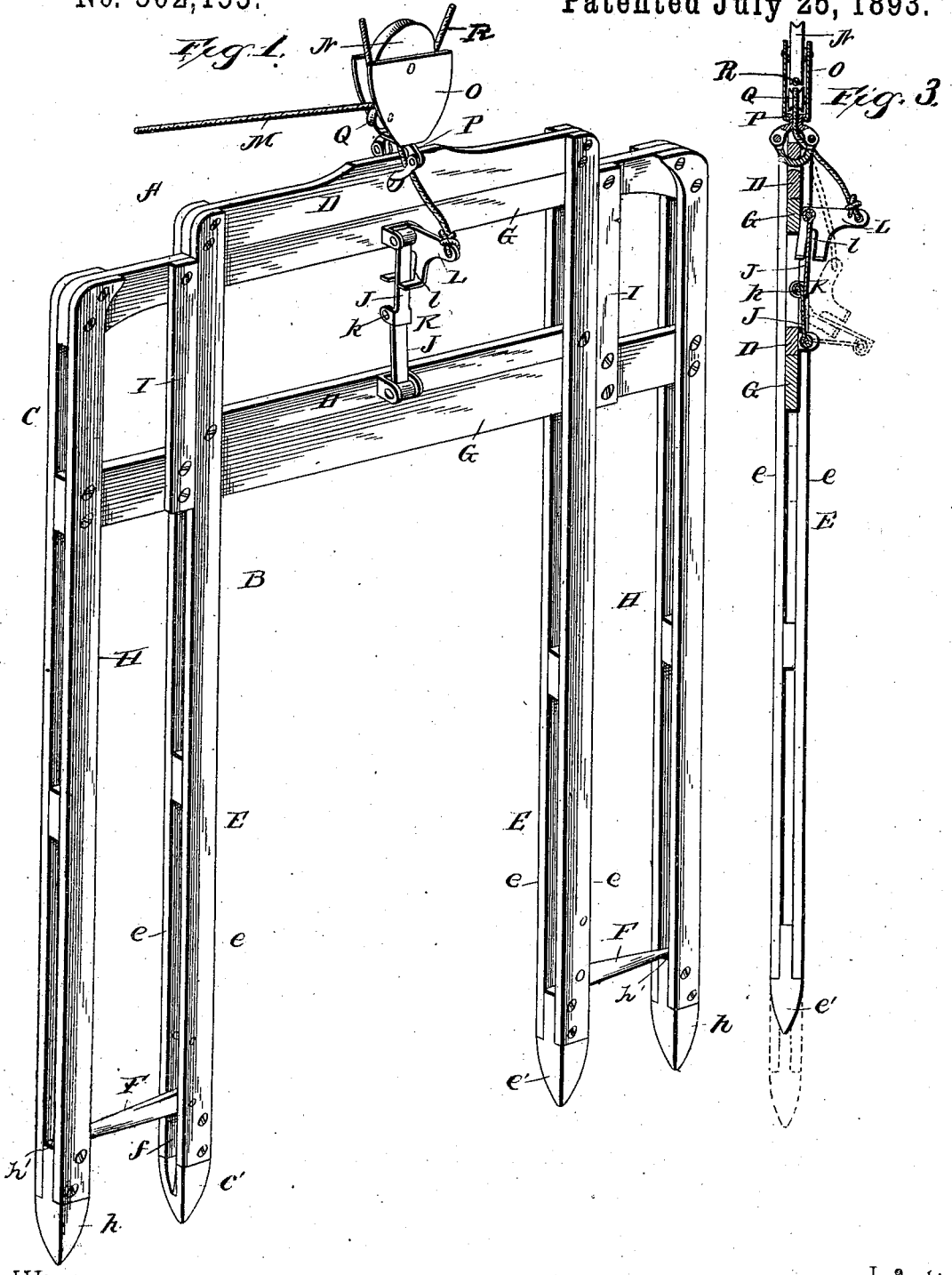

UNITED STATES PATENT OFFICE.

SAMUEL B. WELCH AND STEPHEN WELCH, OF MILLVILLE, IOWA.

HAY-FORK.

SPECIFICATION forming part of Letters Patent No. 502,155, dated July 25, 1893.

Application filed February 6, 1892. Renewed June 27, 1893. Serial No. 478,989. (No model.)

*To all whom it may concern:*

Be it known that we, SAMUEL B. WELCH and STEPHEN WELCH, citizens of the United States, residing at Millville, in the county of Clayton and State of Iowa, have invented a new and useful Hay-Fork, of which the following is a specification.

This invention relates to hay forks; and it has for its object to provide a hay fork designed for use in connection with hay elevators for hoisting the hay from the wagon and depositing the same upon the stack or mow.

To this end it is the object of this invention to provide a hay fork constructed in such a manner as to securely hold the hay whether the same be long or short, and at the same time provide novel means for the locking and tripping of the fork.

With these and many other objects in view which will readily appear as the nature of the invention is better understood, the same consists in the novel construction, combination and arrangement of parts hereinafter more fully described, illustrated and claimed.

In the drawings:—Figure 1 is a perspective view of a hay fork constructed in accordance with our invention, illustrating the positions of the various parts for holding the hay. Fig. 2 is an elevation of the same showing the fork as discharged and ready to be filled. Fig. 3 is a longitudinal sectional view of the same showing both positions of the fork and the lock hinge. Fig. 4 is a detail in perspective of the lock hinge and controlling lever. Fig 5 is a detail sectional view of the hoisting and trip rope pulley.

Referring to the accompanying drawings:— A represents an automatically operating hay fork constructed in accordance with our invention, and the same comprises the intermediate fixed member B and the outer sliding member C, working in and outside of the central fixed member and adapted to discharge the hay and serve to hold the same therein as will be presently described. The central fixed fork member B comprises the upper parallel heads D and the straight tines E connected at their upper ends to said heads. The said tines E may be in any number desired, and each of the same comprises the parallel bars e, secured on both sides of the heads D to space the same, and said parallel bars comprising each tine terminate at their lower ends in the points e', which allow for the ready insertion of the tines into the hay. Pivoted between the parallel bars e of each tine adjacent to the points e', are the pointed tine or drop latches F which are designed to hold the hay in the fork or release the same by their connection or co-operation with the outer sliding fork member as will be presently described.

The sliding fork member C comprises the upper parallel heads G extending between the bars of each tine E, between the heads D and below the lowermost of said heads, and adapted to slide vertically between said tines, said lower head D serving as a stop, by engaging the upper head of the sliding fork member and limiting the downward movement of the same. To the outer ends of said heads G, and to an intermediate point if necessary, are connected the tines H similarly constructed to the fixed tines E and also terminating in the points h, which allow the tines to readily enter the hay as previously noted. It can be readily seen that when the fork is plunged into the hay the tine latches F will raise on their pivots and allow the hay to enter between the tines of the fork, but when the fork is lifted, the said latches under the weight of the hay will be pressed downward and their points drop into the outside tines and rest upon the shoulders h', therein, at the points where the parallel bars of the tines taper into the plunging points h. When the sliding fork member C is locked in its upper position, the hay may be readily elevated, but when allowed to drop to its downward limit of movement, the points thereof will fall below the points of the central fixed tines, and the points of the hay weighted latches will clear the shoulders of said points and allow the hay to drop from the fork, the weight of the hay forcing said latches into the side grooves f at the lower ends of the fixed tines and thus throwing the latches out of the way of the discharged hay. Secured to the parallel heads G of the sliding fork member are the opposite guide strips I working against the outer sides of the outer tines E of the fixed fork member and serving to prevent lateral play of the sliding fork member and keep the same working vertically.

Pivoted to the lower head D of the fixed fork member and the upper head G of the sliding fork member are the opposite members J, of the hinge lock K, the meeting ends of which members are hinged or pivoted together at k to allow the hinge to break outwardly so as to permit the sliding fork member to drop and release the hay, but which lock when straightened out in an opposite direction to that in which it breaks, serves to lock the sliding member within the fixed member while elevating the hay. An operating bell crank lever L is pivoted to the upper head G of the sliding fork member upon the same pivot as the upper member of the lock hinge member, and is provided with a bifurcated flange end l taking over said upper member of the lock hinge, while to the opposite end or arm of said bell crank is connected the trip rope M by means of which the said bell crank may be operated so as to break the joint of said lock hinge and allow the sliding fork member to drop. Loosely connected with the upper head D of the fixed fork member is the main hoisting pulley N journaled in the sheave frame O which sheave frame carries the hollow swivel P, connected with the lower end thereof, and said fixed hay fork member, and with a small trip rope guide pulley Q journaled therein below the hoisting pulley N. The trip rope M passes up through the hollow swivel and over said guide pulley which thus permits the fork to be easily and accurately tripped whenever desired, and thus avoiding the many inconveniences experienced in having the trip rope twist itself around the fork head and its load while going from the load to the stack or mow. The ordinary hoisting rope R is passed over the hoisting pulley N and is connected with any suitable carrier or hoisting device used for elevating and carrying a hay fork. It will be readily seen that after the trip rope is pulled to break the lock hinge, and allow the sliding fork member to drop far enough to clear the points of the tine latches F as described, the hay will readily drop from the fork, as previously noted, and further, in loading the fork no attention is paid to the pivoted drop or tine latches inasmuch as the same are automatic in their operation. The tines of the sliding fork member are first shoved to the proper depth in the hay load, and then the inside tines far enough to allow the lock hinge to straighten properly to hold the sliding fork member in position. By now hoisting the fork, the drop latches fall into the outer tines and hold the hay as already described.

It is thought that the construction, operation and many advantages of the herein described hay fork are apparent without further description.

Having thus described our invention, what we claim, and desire to secure by Letters Patent, is—

1. In a hay fork, the combination of a fixed member, a larger sliding member working in and outside of said fixed member, automatic tine or drop latches pivoted to the tines of said fixed fork member and adapted to fall into the tines of said sliding member, and means for controlling said sliding fork member, substantially as set forth.

2. In a hay fork, the combination with a fixed fork member having parallel heads and a series of open tines secured to said heads, a sliding fork member having parallel heads working between and below the heads of said fixed member, and a series of similar open tines, automatic tine or drop latches pivoted in the lower ends of the tines of said fixed fork member and adapted to fall into the tines of said sliding member, and means for controlling said sliding fork member, substantially as set forth.

3. In a hay fork, the combination of a fixed fork member having parallel heads and a series of straight open tines terminating in pointed ends having side grooves, a sliding fork member having parallel heads working between the open tines and heads of said fixed member, and a series of similar open tines terminating in pointed ends, guide strips secured to the heads of said sliding member on each side of the fixed member tines, automatic tine or drop latches pivoted in the lower ends of the fixed tines directly above the side grooves, and means for controlling said sliding fork member, substantially as set forth.

4. In a hay fork, the combination of the fixed fork member, a sliding fork member working in and outside of said fixed member, supporting devices connected with the tines of said fixed member, a lock hinge comprising opposite members centrally hinged or pivoted together and having their opposite ends pivoted to the heads of the fixed and sliding fork members, respectively, a separate and independent bell crank lever pivoted to the sliding fork head and having a bifurcated flanged arm straddling one of said hinge members, and a trip rope connected with the other arm of said bell crank, substantially as set forth.

5. In a hay fork, the combination with the fork and a suitable tripping device; of the sheave frame, a hoisting pulley journaled within said sheave frame, a smaller trip rope pulley mounted within said sheave frame below said hoisting pulley, a hollow swivel connecting the lower end of the sheave frame with the fork, and a trip rope connected with said tripping device and passing through said hollow swivel and over the trip rope pulley within the sheave frame, substantially as set forth.

In testimony that we claim the foregoing as our own we have hereto affixed our signatures in the presence of two witnesses.

SAMUEL B. WELCH.
STEPHEN WELCH.

Witnesses:
JOSEPH GRIMES,
JOHN R. WELCH.